(12) United States Patent
Sunata et al.

(10) Patent No.: US 11,307,797 B2
(45) Date of Patent: Apr. 19, 2022

(54) STORAGE DEVICE AND INFORMATION PROCESSING SYSTEM

(71) Applicant: Kioxia Corporation, Tokyo (JP)

(72) Inventors: Tetsuya Sunata, Yokohama Kanagawa (JP); Daisuke Iwai, Yokohama Kanagawa (JP); Kenichiro Yoshii, Bunkyo Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/290,633

(22) Filed: Mar. 1, 2019

(65) Prior Publication Data
US 2020/0089428 A1 Mar. 19, 2020

(30) Foreign Application Priority Data
Sep. 14, 2018 (JP) .............................. JP2018-172756

(51) Int. Cl.
*G06F 3/06* (2006.01)
*G06F 12/02* (2006.01)

(52) U.S. Cl.
CPC .......... *G06F 3/0658* (2013.01); *G06F 3/0616* (2013.01); *G06F 3/0652* (2013.01); *G06F 3/0673* (2013.01); *G06F 12/0253* (2013.01)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 4,924,428 A * 5/1990 Vea ...................... G06F 11/3423
702/178
5,784,616 A * 7/1998 Horvitz ................. G06F 9/4881
718/100
(Continued)

FOREIGN PATENT DOCUMENTS

JP 2005-321959 11/2005
JP 2017-117055 6/2017

OTHER PUBLICATIONS

G. Yan et al., "DLS: A Delay-Life-Aware I/O Scheduler to Improve the Load Balancing of SSD-Based RAID-5 Arrays," 2019 IEEE 21st International Conference on High Performance Computing and Communications, pp. 2445-2450; 2019 (Year: 2019).*

*Primary Examiner* — Daniel C. Chappell
(74) *Attorney, Agent, or Firm* — Foley & Lardner LLP

(57) ABSTRACT

According to one embodiment, a storage device is accessible by an external device via an interface and includes a nonvolatile memory including one or more blocks, and a controller electrically connected to the nonvolatile memory. The controller receives from the external device a request and a notification indicating that a response performance of the request is to be lowered. In response to receiving the request and notification, the controller determines a response time longer than a processing time of the request, and executes a first performance lowering process that executes a block managing process of the nonvolatile memory by using an idle time which is a difference between the response time and the processing time of the request or executes a second performance lowering process that lowers the response performance so as to process the request by spending the response time.

13 Claims, 7 Drawing Sheets

(58) Field of Classification Search
CPC ............ G06F 8/00–78; G06F 9/00–54; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,856,786 | A * | 1/1999 | DiFrancisco | H04L 12/12 340/635 |
| 5,995,997 | A * | 11/1999 | Horvitz | G06F 9/4818 718/102 |
| 6,009,452 | A * | 12/1999 | Horvitz | G06F 9/4881 718/102 |
| 6,160,848 | A | 12/2000 | Sivan | |
| 8,856,424 | B2 * | 10/2014 | Yoon | G06F 3/0653 711/103 |
| 9,015,403 | B2 * | 4/2015 | Jeong | G11C 16/349 711/103 |
| 9,696,911 | B2 * | 7/2017 | Kim | G06F 3/0688 |
| 10,929,285 | B2 * | 2/2021 | R | G06F 3/0679 |
| 2002/0186397 | A1 * | 12/2002 | Ito | H04N 1/32 358/1.14 |
| 2005/0223385 | A1 * | 10/2005 | Braun | G06F 9/3802 718/108 |
| 2005/0251548 | A1 | 11/2005 | Hayashi et al. | |
| 2009/0132705 | A1 * | 5/2009 | Matsuzaki | H04L 43/0852 709/225 |
| 2011/0185364 | A1 * | 7/2011 | Fernandes | G06F 9/5083 718/104 |
| 2012/0102263 | A1 * | 4/2012 | Aswadhati | G06F 3/0616 711/103 |
| 2014/0215253 | A1 * | 7/2014 | Klassen | G06F 1/324 713/340 |
| 2014/0359196 | A1 * | 12/2014 | Ragland | G06F 13/1689 711/102 |
| 2015/0169443 | A1 * | 6/2015 | Lee | G06F 12/0246 711/103 |
| 2015/0378730 | A1 * | 12/2015 | Atzmon | G06F 9/30145 712/227 |
| 2016/0299689 | A1 | 10/2016 | Kim et al. | |
| 2017/0177218 | A1 * | 6/2017 | Kanno | G06F 12/0253 |
| 2017/0371794 | A1 * | 12/2017 | Kan | G06F 3/0656 |
| 2018/0349143 | A1 * | 12/2018 | Park | G06F 9/3836 |
| 2020/0042181 | A1 * | 2/2020 | Lee | G06F 3/0679 |

* cited by examiner

*FIG. 4*

| ATTRIBUTE | DESCRIPTION | |
|---|---|---|
| PERFORMANCE ADJUSTMENT (2bit) | VALUE | DEFINITION |
| | 00 | NO ADJUSTMENT/PROCESS WITH THE BEST PERFORMANCE |
| | 01 | MAINTAIN THE CURRENT PERFORMANCE |
| | 10 | IMPROVE PERFORMANCE DUE TO I/O STANDBY |
| | 11 | LOWER PERFORMANCE DUE TO ANOTHER RESOURCE STANDBY |

| ACCESS TYPE (101) | THE CLOSEST REQUEST PROCESSING TIME (102) | ADJUSTMENT STATE (103) |
|---|---|---|
| 4KiB RANDOM Read | x1 [us] | -z1 [%] |
| 4KiB RANDOM Write | x2 [us] | -z2 [%] |
| 128KiB SEQUENTIAL Read | y1 [us] | 0 [%] |
| 128KiB SEQUENTIAL Write | y2 [us] | 0 [%] |
| ⋮ | ⋮ | ⋮ |

FIG. 10

| PROCESS ID | EXPECTED OPERATION PERFORMANCE |
|---|---|
| 1 | best effort |
| 2 | 90% |
| 3 | 95% |
| ⋮ | ⋮ |

STORAGE DEVICE AND INFORMATION PROCESSING SYSTEM

CROSS-REFERENCE TO RELATED APPLICATIONS

This application claims the benefit of and priority to Japanese Patent Application No. 2018-172756, filed Sep. 14, 2018, the entire contents of which are incorporated herein by reference.

FIELD

Embodiments described herein relate generally to a storage device and an information processing system.

BACKGROUND

In recent years, storages equipped with a nonvolatile memory have been widely spread. One of such storages is a solid-state drive (SSD) having a NAND type flash memory. An SSD is being used as a main storage of various computing devices.

When a request such as data write or read is received, the SSD may process the request with the best effort. Here, the term "best effort" refers to executing a process with maximum utilization of resources of the SSD without intentionally delaying the process.

DESCRIPTION OF THE DRAWINGS

FIG. 4 is a view illustrating an example of attribute information on performance adjustment according to the first embodiment.

FIG. 5 is a view illustrating an example of a table for managing the performance adjustment state of an SSD according to the first embodiment.

FIG. 10 is a view illustrating an example of a table for managing performance adjustment for each process according to a third embodiment.

DETAILED DESCRIPTION

Figure 1:
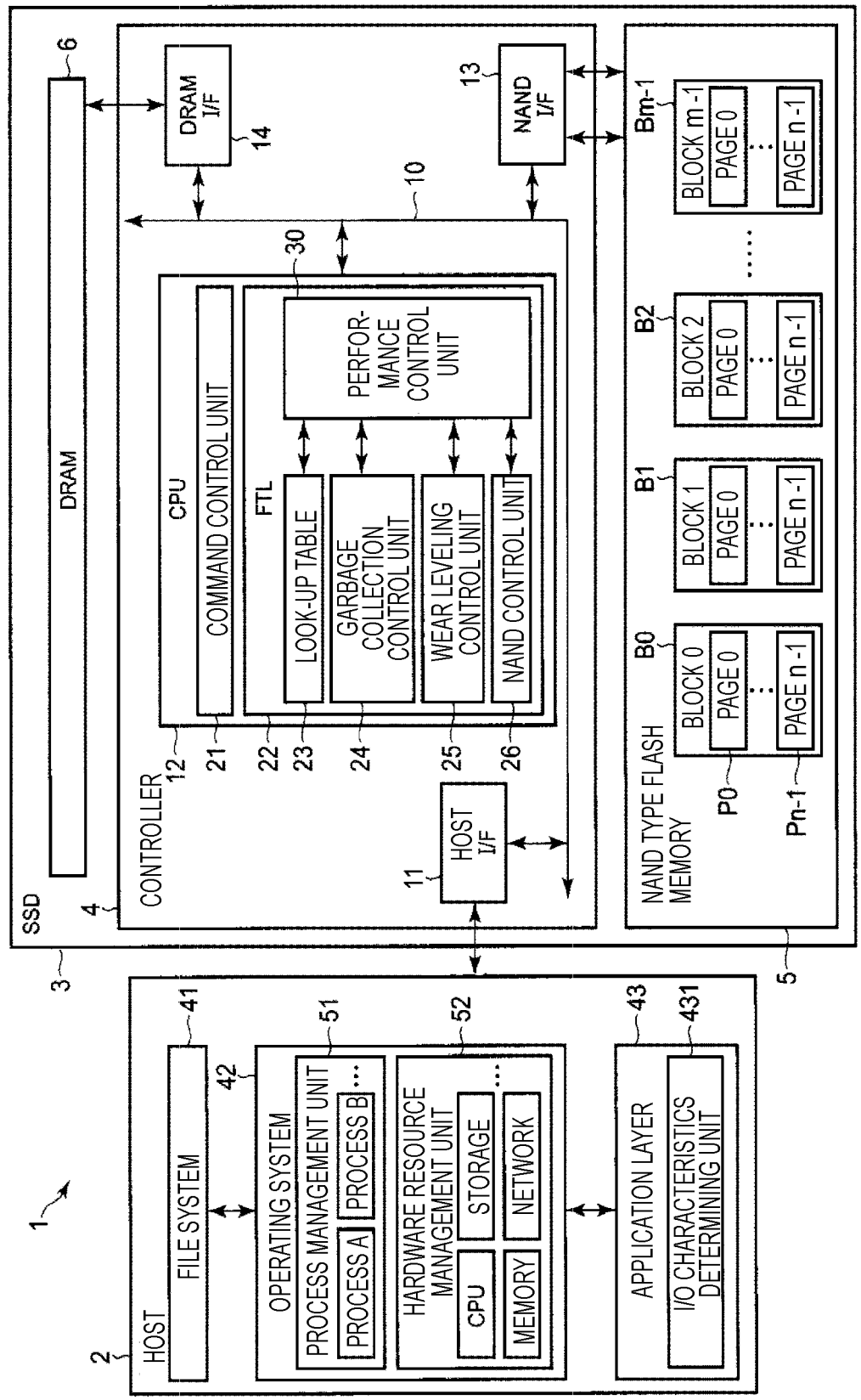
FIG. 1 is a block diagram illustrating an example of a configuration of a computer system according to a first embodiment.

Embodiments of the present disclosure provide a storage device and an information processing system capable of optimally adjusting a response performance.

In general, according to one embodiment, a storage device may be accessible by a host via an interface and may include a nonvolatile memory including one or more blocks, and a controller electrically connected to the nonvolatile memory. When receiving from the host a request and a notification indicating that the response performance of the request is to be lowered, the controller may be configured to determine a response time longer than a processing time of the request and execute a first performance lowering process that executes a block managing process of the nonvolatile memory by using an idle time which is a difference between the response time and the processing time of the request or execute a second performance lowering process that lowers the response performance so as to process the request by spending the response time.

Hereinafter, embodiments will be described with reference to the accompanying drawings. In the following description, similar or substantially the same functions and components will be denoted by the same reference numerals, and explanation thereof will be made as necessary.

First Embodiment

In the first embodiment, "I/O" may refer to an access to an SSD 3 from, for example, a host (host device) 2 to be described later. The "I/O standby" may refer to a state in which the host 2 is waiting for a response from the SSD 3. Here, the host may be an information processing apparatus that accesses the SSD 3.

In the first embodiment, "request" refers to, for example, a processing request. The request may be mainly issued from the host 2 to the SSD 3. The SSD 3 that processed the request may return a response to the host 2. The response may refer to a response responding to the request with a processing result.

In the following, the configuration and processing of the host 2 and the SSD 3 cooperating with each other to determine the optimum response performance will be described.

FIG. 1 is a block diagram illustrating an example of a configuration of a computer system 1 according to the first embodiment. The computer system 1 may be also referred to as an information processing system 1.

The computer system 1 may include the host 2 and the SSD 3.

The host 2 may be an information processing apparatus (computing device) that accesses the SSD 3. The host 2 may be a server (storage server) that stores a large amount of various data in the SSD 3, or may be a personal computer. The SSD 3 may be a semiconductor storage device configured to write data to a nonvolatile memory such as a NAND type flash memory and to read data from the nonvolatile memory.

When issuing a request to the SSD 3, the host 2 may grasp (or determine) the following first to third cases regarding the request. The first case is a case where the request is a synchronous I/O. In this case, the host 2 expects a response to the request from the SSD 3 with the best effort. The second case is a case where the request is an asynchronous I/O and it is understood that the bottleneck of a processing speed of the request is not an access to the SSD 3. The third case is a case where the request is an asynchronous I/O and it is understood that the bottleneck of the processing speed of the request is an access to the SSD 3.

In the first and third cases, the SSD 3 may preferably process the request with the best effort. Meanwhile, in the second case, since the bottleneck is other than the access to the SSD 3, the SSD 3 need not return a response to the host 2 with the best effort.

The SSD 3 is a storage device and may be used as a main storage of the information processing apparatus functioning as the host 2. The SSD 3 may be incorporated in the information processing apparatus or may be connected to the information processing apparatus via a cable or a network. The SSD 3 is electrically connected to the host 2, for example, as a direct attached storage (DAS).

Examples of an interface for interconnecting the host 2 and the SSD 3 may include SCSI (Small Computer System Interface), SAS (Serial Attached SCSI), ATA (Advanced Technology Attachment), SATA (Serial ATA), PCI Express (PCIe)®, Ethernet®, Fiber channel, and NVM (Non-Volatile Memory) Express (NVMe)®.

The SSD 3 includes, for example, a controller 4 and a NAND type flash memory 5. The controller 4 may be implemented, for example, by a circuit such as SoC (System-on-a-chip). The SSD 3 may include a random access memory which is a volatile memory, for example, DRAM (Dynamic Random Access Memory) 6. Alternatively, a random access memory such as SRAM (Static Random Access Memory) may be incorporated in the controller 4.

The random access memory such as the DRAM 6 has, for example, a read buffer which is a buffer area for temporarily storing data read out from the NAND type flash memory 5, a write buffer which is a buffer area for temporarily storing data written in the NAND type flash memory 5, and a buffer used for a garbage collection (or compaction). The DRAM 6 may be incorporated in the controller 4.

The NAND type flash memory 5 may include plural NAND type flash memory chips (or plural NAND type flash memory dies).

Each of the chips may include a memory cell array. The memory cell array may include plural NAND blocks B0 to Bm−1. Each of the blocks B0 to Bm−1 may function as an erase unit. A block may also be referred to as a "physical block" or an "erase block".

Each of the blocks B0 to Bm−1 may include plural pages (plural physical pages). That is, each of the blocks B0 to Bm−1 may include pages P0 to Pn−1. In the nonvolatile memory, data reading and data writing may be executed on a page basis. Data erasing may be executed on a block basis.

The controller 4 may be a memory controller configured to control the NAND type flash memory 5.

The controller 4 includes, for example, a host interface 11, a CPU 12, a NAND interface 13, and a DRAM interface 14. The host interface 11, the CPU 12, the NAND interface 13, and the DRAM interface 14 may be interconnected via a bus 10.

The host interface 11 may function as a circuit which receives various requests from the host 2 and transmits responses to the requests to the host 2. The requests may include various commands such as an I/O command and a control command. The I/O command may include, for example, a write command, a read command, an unmap command (or trim command), a format command, and a flush command. The write command is also called a program command. The format command is a command for unmapping the entire memory system (e.g., SSD 3). The flush command is a command for writing all dirty data (e.g., user data and associated management data) cached (or buffered) in the memory system into the NAND flash memory 5 to clean all the dirty data away.

The DRAM interface 14 may function as a DRAM controller configured to control an access to the DRAM 6.

The NAND interface 13 may function as a NAND control circuit configured to control the NAND type flash memory 5. The NAND interface 13 may be connected to plural chips in the NAND type flash memory 5 via plural channels.

The CPU 12 may be a processor configured to control the host interface 11, the NAND interface 13, and the DRAM interface 14. The CPU 12 may perform various processes by executing a control program (e.g., firmware) stored in, for example, a ROM (not shown).

In the first embodiment, the CPU 12 functions as, for example, a command control unit 21 and a flash translation layer (FTL) 22.

The command control unit 21 may execute command processing for processing the above-described various commands received from the host 2.

The flash translation layer 22 may execute data management and block management of the NAND flash memory 5.

The data management includes, for example, management of mapping information indicating a correspondence relationship between a logical address and a physical address of the NAND flash memory 5. Here, the logical address may be an address used by the host 2 to designate an address of the SSD 3. For example, a logical block address (LBA) is used as this logical address.

Management of mapping between each logical block address (LBA) and each physical address may be executed by using a look-up table 23 functioning as an address translation table (e.g., logical/physical address translation table). The controller 4 may use the look-up table 23 to manage the mapping between each LBA and each physical address in units of a predetermined management size. A physical address corresponding to a certain LBA indicates a physical storage location in the NAND type flash memory 5 in which the data of this LBA is written. The look-up table 23 may be loaded from the NAND type flash memory 5 into the DRAM 6 when the SSD 3 is powered on.

For example, when a read command is received, the command control unit 21 may obtain a physical address corresponding to a logical address (LBA) based on the entry of the look-up table 23 corresponding to the LBA, and read data according to the read command from the NAND type flash memory 5.

Further, for example, when a write command is received, the command control unit 21 may accumulate data received from the host 2 in accordance with the write command in a buffer on the DRAM 6. Further, the command control unit 21 may send a program command to a chip of the NAND type flash memory 5 so as to program the data accumulated in the buffer in a write destination block with respect to the chip.

Meanwhile, the block management includes, for example, garbage collection (GC) and wear leveling.

A garbage collection control unit 24 executes the garbage collection (GC). Here, the GC is a process executed to generate a free block as a data write destination block. More specifically, the garbage collection control unit 24 may select a GC source block from an already written block (or active block), gather valid data from the GC source block, write the valid data in a new block (GC destination block), and take a block in which valid data is originally stored, as a free block.

A wear leveling control unit 25 executes the wear leveling. The wear leveling is a process of leveling the number of times of block erasure. In particular, by preventing an occurrence of blocks with a larger number of erasures, the failure probability of the SSD 3 can be reduced.

The NAND control unit 26 may execute control of the above-described NAND interface 13.

A performance control unit 30 may execute the performance adjusting process of the SSD 3. More specifically, the performance control unit 30 may determine whether to perform the performance adjusting process, for example, by a notification from the host 2. When executing the performance adjusting process, the performance control unit 30 may improve or reduce the performance of response to the request within a range of performance adjustment width of the SSD 3.

When executing the performance adjusting process, the performance control unit 30 may calculate a response time to be taken from the reception of the request from the host 2 to the transmission of the response to the host 2. Further, it is preferable that the performance control unit 30 calculates in advance a processing time (hereinafter, referred to as a request processing time) required when processing the request with the best effort.

When the response time is longer than the request processing time, the performance control unit 30 may calculate an idle time which is a difference between the response time and the request processing time. In this case, the performance control unit 30 may execute a process that processes the request with the best effort and complete the processing within the idle time (e.g., GC and wear leveling described above).

Further, in this case, the performance control unit 30 may lower the response performance corresponding to the request so as to complete the processing of the request, for example, by spending the idle time (spending the response time). As an example of lowering the performance of response to the request may include, for example, reducing the number of parallel NAND accesses. The number of parallel NAND accesses indicates the number of channels accessible in parallel to the NAND type flash memory 5 from the controller 4. As the number of parallel NAND accesses increases, the speed of access to the NAND flash memory 5 increases. For example, when the number of parallel NAND accesses is 16 channels, the access speed is approximately doubled as compared with when the number of parallel NAND accesses is 8 channels.

The performance control unit 30 may manage the performance adjustment state in the SSD 3 and notify the performance adjustment state to the host 2. The management of the performance adjustment state of the SSD 3 will be described later with reference to FIG. 5.

Next, the configuration of the host 2 will be described. The host 2 has a function for accessing the SSD 3 connected as a DAS. Further, the host 2 may have a function for accessing a storage on a network (e.g., cloud).

The host or information processing apparatus 2 executes various programs. The programs executed by the information processing apparatus include, for example, a file system 41, an operating system (OS) 42, and an application layer 43.

The file system 41 is used for controlling file operation (e.g., creating, saving, updating, or deleting). For example, ZFS, Btrfs, XFS, ext 4, or NTFS may be used as the file system 41. Alternatively, a file object system (e.g., Ceph Object Storage Daemon) or a key value store system (e.g., RocksDB) may be used as the file system 41.

The operating system (OS) 42 is software configured to manage the entire host 2, control the hardware in the host 2, and perform a control for enabling an application to use the hardware and the SSD 3.

The operating system 42 includes, for example, a process management unit 51 and a hardware resource management unit 52.

The process management unit 51 may manage the state of various processes operating on the operating system 42.

The hardware resource management unit 52 may manage the state of the hardware resources in the host 2. Examples of the hardware resources of the host 2 may include a CPU (Central Processing Unit), various storages, a memory, and a network.

Various application software threads are executed on the application layer 43. Examples of the application software threads may include client software, database software, and virtual machine.

When transmitting a request to the SSD 3, the application layer 43 may first transmit the request to the OS 42. The OS 42 may transmit the request to the file system 41. The file system 41 may convert the request into a command (e.g., a read command or a write command). The file system 41 may transmit the command to the SSD 3. When a response is received from the SSD 3, the file system 41 may transmit the response to the OS 42. The OS 42 may transmit the response to the application layer 43.

The application layer 43 includes an I/O characteristics determining unit 431 (or an I/O characterization unit). The I/O characteristics determining unit 431 may monitor the state of hardware used in each process and determine whether or not the I/O standby is a bottleneck.

The I/O characteristics determining unit 431 may grasp (or determine) the I/O characteristics of each process managed by the process management unit 51, and determine whether or not the SSD 3 performs performance adjustment. Then, when transmitting a request to the SSD 3, the host 2 may instruct the SSD 3 to adjust the performance by sending a notification on the performance adjustment of the SSD 3 based on the determination. Details of this notification on the performance adjustment will be described later with reference to FIG. 4.

The I/O characteristics determining unit 431 may grasp (or determine) the I/O characteristics of each process, for example, from the following first or second viewpoint. In the first viewpoint, the I/O characteristics determining unit 431 may determine the I/O characteristics of the process based on, for example, the state and type of a single process that issued an I/O request. That is, the I/O characteristic determining unit 431 may determine whether or not the issued I/O request is a bottleneck in executing the process.

Specifically, for example, when the process is moving image playback, an I/O request during the moving image playback may be often a read request for caching moving image data. Therefore, the I/O characteristic determining unit 431 may determine that a response with the best effort is unnecessary for the I/O request.

Meanwhile, in the second viewpoint, the I/O characteristics determining unit 431 may determine the I/O characteristics of the process that issued the I/O request, based on, for example, the usage rate of other hardware resources.

Specifically, for example, when the usage rate of the CPU resources of the host 2 as a whole is high and the CPU resources become a bottleneck even in the process that issued the I/O request, the I/O characteristics determining unit 431 may determine that a response to the I/O request with the best effort is unnecessary.

In other words, according to the second viewpoint, the I/O characteristics determining unit 431 is able to grasp (or determine) the I/O characteristics of the process based on the execution state of not only the single process that issued the I/O request but also other plural processes.

The I/O characteristics determining unit 431 may acquire the performance adjustment state from the SSD 3. The I/O characteristics determining unit 431 may determine the notification contents concerning the future performance adjustment of the SSD 3 based on, for example, the acquired performance adjustment state.

Figure 2:
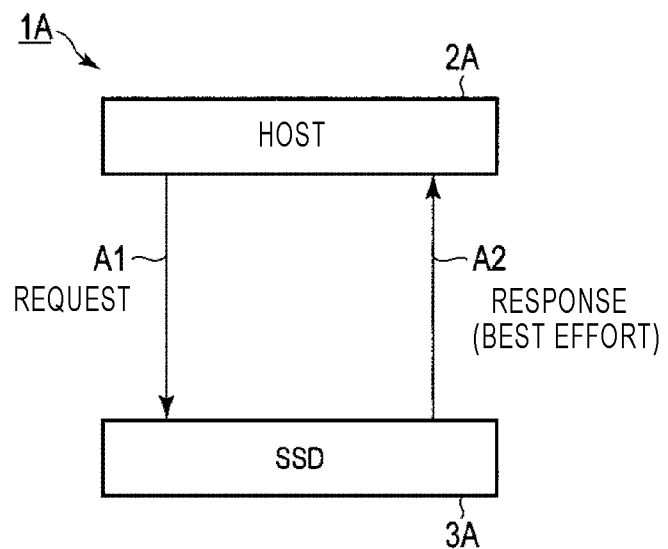
FIG. 2 is a view illustrating a first example of a request and a response between a host and an SSD.
Figure 3:
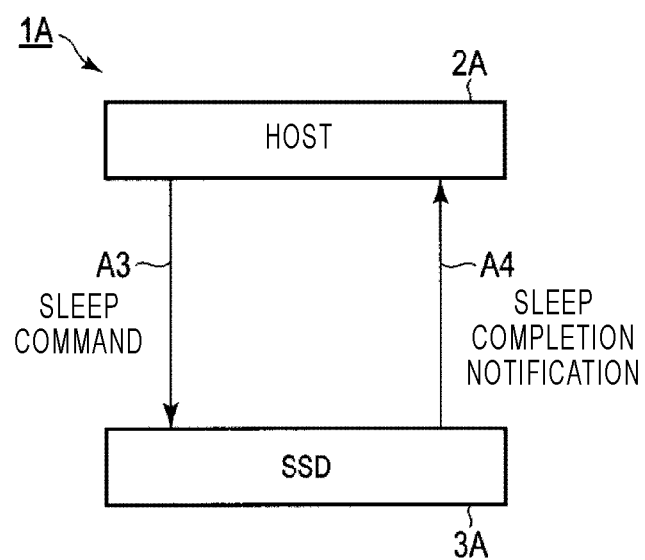
FIG. 3 is a view illustrating a second example of a request and a response between a host and an SSD.

FIG. 2 and FIG. 3 are views illustrating examples of a request and a response between a host 2A and an SSD 3A in a computer system 1A according to a comparative example.

As illustrated in FIG. 2, in the computer system 1A of the comparative example, the host 2A issues a request including, for example, a read command or a write command for the SSD 3A, and transmits the request to the SSD 3A (arrow A1). The SSD 3A processes the request received with the best effort. Then, the SSD 3A transmits a response to the request to the host 2A (arrow A2).

That is, in the computer system 1A according to the comparative example, a response is transmitted from the SSD 3A in substantially the same time (e.g., the response is immediately transmitted), regardless of whether the I/O standby is a bottleneck in the process that issued the request. Because the SSD according to the comparative example cannot determine whether I/O standby is a bottleneck in the process that issued the request, the response is immediately transmitted.

As illustrated in FIG. 3, in the computer system 1A of the comparative example, after checking the response received from the SSD 3A, the host 2A transmits a sleep command to the SSD 3A when there is no next process requested to the SSD 3A (arrow A3). The SSD 3A transmits a sleep completion notification to the host 2A (arrow A4) and transitions to a low power consumption mode. In this way, in the computer system 1A of the comparative example, the host 2A transitions the SSD 3A to the low power consumption mode when there is no more request to be processed. When the SSD 3A transitions to the low power consumption mode, the execution of a process for the block management of the NAND flash memory, which is the background process of the SSD 3A (e.g., wear leveling or GC), may be restricted.

FIG. 4 is a view illustrating an example of the attribute information on the performance adjustment according to the first embodiment.

The attribute information on the performance adjustment is, for example, 2-bit information. As described above, this attribute information may be notified to an SSD 3 together with a request transmitted from a host 2 to the SSD 3. The SSD 3 may determine the contents of a performance adjusting process to be executed, based on the received attribute information.

For example, when the attribute information is "00," it indicates that the host 2 requests the SSD 3 to process the request with the highest response performance (i.e., with the best performance). When the attribute information is "01," it indicates that the host 2 requests the SSD 3 to maintain the current response performance. When the attribute information is "10," it indicates that the host 2 requests the SSD 3 to improve the response performance because the I/O standby is being generated (I/O bottleneck) in the process that issued the request. When the attribute information is "11," it indicates that the host 2 requests the SSD 3 to lower the response performance because another resource standby is being generated (not I/O bottleneck).

This attribute information may be implemented by using, for example, a portion of a reserved area of a read command or a write command prescribed in the NVMe standards.

This attribute information may be also 1-bit information indicating ON or OFF of the performance adjustment or may be 3-bit or more information expressing the contents of the performance adjustment more finely. When the number of bits of the attribute information is large, for example, information on the adjustment ratio of the response performance may be added to the request for improving or lowering the response performance as described above. The information on the adjustment ratio of the response performance is, for example, information on how much the response performance should be lowered from the best effort or how much the response performance should be improved from the present. As a result, the SSD 3 may perform the performance adjustment more finely.

FIG. 5 is a view illustrating an example of a table TB1 for managing the performance adjustment state of the SSD 3 according to the first embodiment.

The performance control unit 30 of the SSD 3 may manage the performance adjustment state by using, for example, the table TB1. For example, the table TB1 may store the performance adjustment state in the latest request processing or may store the performance adjustment state in the past several request processing. The table TB1 is stored in, for example, the DRAM 6.

The table TB1 manages, for example, an access type 101, a request processing time 102, and an adjustment state 103 in association with each other.

The access type 101 may indicate the type of a command included in a request. The request processing time 102 may indicate the time taken for command processing for each access type 101.

The adjustment state 103 is, for example, information indicating how much the performance of the processing for each access type 101 is adjusted from the best effort.

For example, the table TB1 represents that the request processing time 102 of 4 KiB random read is x1 [us]. Further, the table TB 1 represents that the 4 KiB random read is adjusted so as to lower the response performance by z1 [%] from the best effort state.

Further, it is preferable that the adjustment width capable of adjusting the performance is preset in the SSD 3. Here, the adjustment width refers to a value determined such that the performance of response to a request be adjusted within a range of the performance adjustment width of SSD. This adjustment width may be set by, for example, the Set Features command of the NVMe standards.

The performance control unit 30 may calculate the time of response to the current request based on the request processing time 102 managed by the table TB 1 and the adjustment width. For example, the performance control unit 30 may calculate the best-effort request processing time from TB1 and then calculate the time of response to the current request based on the best-effort request processing time and the adjustment width.

Figure 6:
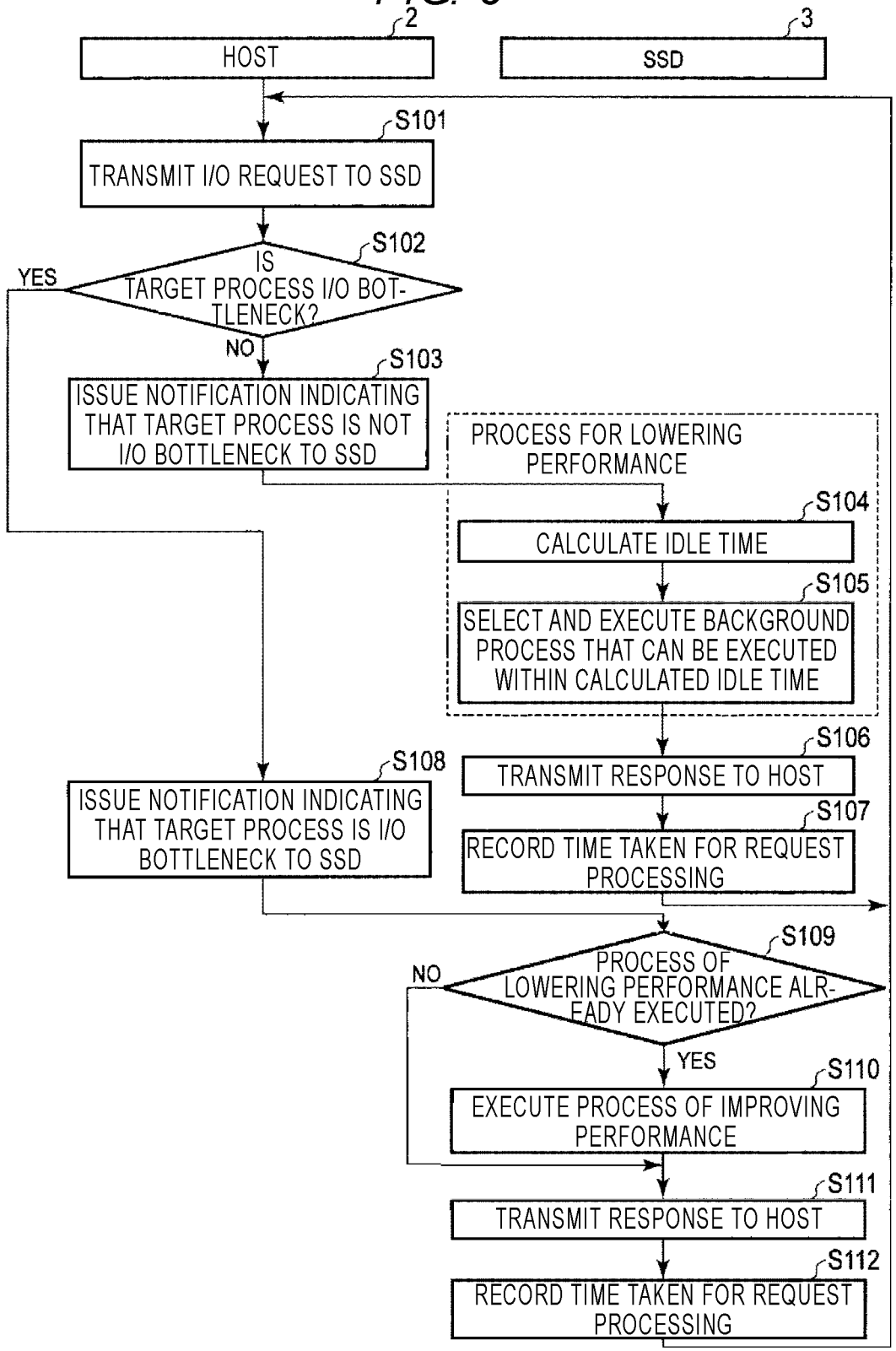
FIG. 6 is a flowchart illustrating an example of a performance adjusting process in the computer system according to the first embodiment.

FIG. 6 is a flowchart illustrating an example of the performance adjusting process in the computer system according to the first embodiment. In FIG. 6, it is assumed that a certain process requiring an access to the SSD 3 is being executed in the host 2.

In step S101, the host 2 transmits an I/O request to the SSD 3. The I/O request may be executed by an instruction of a target process.

In step S102, the I/O characteristics determining unit 431 of the host 2 checks whether or not the target process is an I/O bottleneck. When it is determined that the target process is not an I/O bottleneck, the process proceeds to step S103. Meanwhile, when it is determined that the target process is an I/O bottleneck, the process proceeds to step S108.

In step S103, the host 2 notifies the SSD 3 that the target process is not an I/O bottleneck. More specifically, the host 2 may notify the SSD 3 of the performance adjustment by setting the attribute information on the performance adjustment to "11" and adding the attribute information to the I/O request to be transmitted in step S101.

In steps S104 and S105, the performance of response to the I/O request received by the SSD 3 may be lowered. In step S104, the performance control unit 30 calculates an idle time based on the performance adjustment notification received from the host 2. In step S105, the performance control unit 30 selects and executes a background process that is executable within the calculated idle time (e.g., a process for the block management of the NAND flash memory such as wear leveling or GC). The performance control unit 30 may lower the response performance of the request so as to complete the processing of the request by spending the idle time (so that response time is longer than the best-effort processing time).

In step S106, the SSD 3 transmits a response to the processed request to the host 2.

In step S107, the performance control unit 30 records, for example, the time taken for the request processing and the adjustment state, in the table TB1 that manages the performance adjustment state.

In steps S108 to S112, the response performance of the SSD 3 is improved.

In step S108, the host 2 notifies the SSD 3 that the target process is not an I/O bottleneck. More specifically, the host 2 may add the attribute information "10" on the performance adjustment to the I/O request to be transmitted in step S101.

In step S109, the performance control unit 30 checks whether or not the process of lowering the response performance has already been executed. More specifically, the performance control unit 30 may read the adjustment state 103 of the table TB1 to determine, for example, how much the performance of the request processing is lowered from the best effort.

When it is determined that the process for lowering the response performance is being executed, in step S110, the performance control unit 30 executes a process for improving the response performance. More specifically, the performance control unit 30 may reduce, for example, the idle time at a predetermined rate, or may shorten the response time by increasing the number of parallel NANDs.

Meanwhile, when it is determined that the process of lowering the response performance is not executed in step S109, since the SSD 3 is already operating with the best effort, the process (step S110) for improving the response performance is not performed.

Since the process in steps S111 and S112 is the same as the process in steps S106 and S107, explanation thereof will be omitted.

Figure 7:
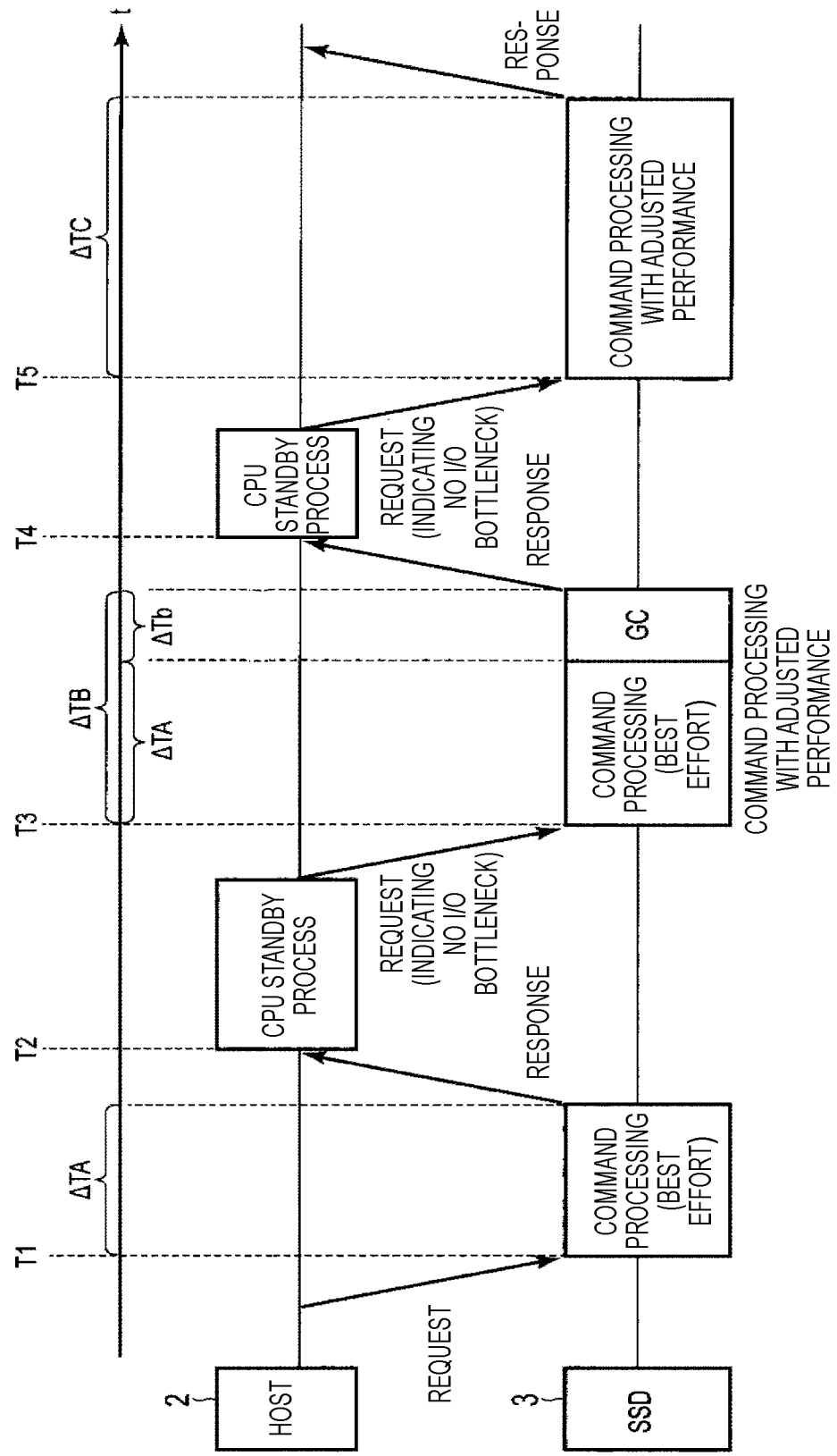
FIG. 7 is a timing chart illustrating an example of the performance adjusting process in the computer system according to the first embodiment.

FIG. 7 is a timing chart illustrating an example of the performance adjusting process in the computer system according to the first embodiment. In FIG. 7, the horizontal axis represents time.

First, the host 2 transmits an I/O request to the SSD 3. At time T1, the SSD 3 starts a command process included in the received I/O request. The SSD 3 executes the command process with the best effort and completes the process after time ΔTA. Thereafter, the SSD 3 transmits a response to the host 2.

At time T2, the host 2 executes, for example, a CPU standby process. Thereafter, the host 2 transmits the I/O request to the SSD 3 together with a notification indicating that the target process is not an I/O bottleneck.

The performance control unit 30 of the SSD 3 lowers the response performance of the SSD 3 based on the received notification. Specifically, the performance control unit 30 calculates an idle time ΔTb. Then, for example, the SSD 3 executes the command process included in the request received at time T3 with the best effort, and executes a GC in the subsequent idle time ΔTb. Thereafter, the SSD 3 transmits a response to the host 2. The sum of the command processing time ΔTA and the idle time ΔTb is a response time ΔTB for this I/O request.

At time T4, for example, the host 2 executes the CPU standby process again. Thereafter, the host 2 transmits the I/O request to the SSD 3 together with a notification indicating that the target process is not an I/O bottleneck.

The performance control unit 30 of the SSD 3 further lowers the response performance of the SSD 3 based on the received notification. In the example of FIG. 7, the performance control unit 30 calculates a response time ΔTC after calculating an idle time. Then, at time T5, the performance control unit 30 executes a command process included in the received I/O request, and reduces, for example, the number of parallel NAND accesses so that the command process time becomes this response time ΔTC. Thereafter, the SSD 3 transmits a response to the host 2.

In the embodiment described above, when a certain process is not an I/O bottleneck, the host 2 transmits to the SSD 3 a notification indicating that the process is not an I/O bottleneck, together with an I/O request. The SSD 3 lowers the response performance of the SSD 3 based on the notification. As a result, the performance adjustment of the SSD 3 can be executed without lowering the user's empirical performance of the host 2.

In addition, each time the idle time occurs due to this performance adjustment, the SSD 3 may use the idle time to execute block management such as wear leveling or GC. Therefore, since the block management state is maintained in the SSD 3, for example, the response performance can be constantly improved as compared with a case where the block management is intensively performed. More specifically, it is possible to avoid a situation where a request from the host 2 is restricted due to increase in request of block management occurring inside the SSD 3. Therefore, for example, it is possible to prevent a response from the SSD 3 from being suddenly delayed at a timing not intended by the host 2.

In addition, the host 2 may receive a response to the I/O request at a timing delayed by the performance adjustment. The host 2 may check resources that become a bottleneck of the process, again. Here, when the I/O standby has not yet occurred, the host may notify the SSD 3 that the process is not an I/O bottleneck. As a result, the host 2 may continuously perform the performance adjustment of the SSD 3.

Further, periodically executing the block management also contributes to reduction of the permanent peak power of the SSD 3.

In the first embodiment, the SSD 3 can flexibly improve the response performance of the SSD 3 other than the processing speed, by using the idle time to change the contents of the process to be executed. For example, when the response performance of the SSD 3 is lowered, the response performance is improved by performing the block management using the idle time. In addition, when the power consumption of the SSD 3 is high, since the request processing is executed by spending the idle time (response time), it is possible to temporarily lower the power consumption by reducing the number of parallel NAND accesses.

In the first embodiment, the host 2 may use the reserved area of the read command or the write command to notify the SSD 3 of the attribute information on the performance adjustment. That is, since the host 2 is able to notify the SSD 3 of the attribute information by using the existing interface, the user's convenience of the computer system 1 can be improved.

In the first embodiment, the host 2 may determine the I/O characteristics of a process based on, for example, the usage rate of one or more hardware resources. That is, since it is possible to determine the I/O characteristics taking into consideration the execution state of other plural processes, the determination precision of the I/O characteristics can be improved.

In the first embodiment, it has been described that the SSD 3 performs the performance adjustment on a single I/O request received from the host 2. However, the SSD 3 may perform the performance adjustment for plural I/O requests. As a result, since the SSD 3 may perform the performance adjustment by capturing the plural requests as one transaction, more idle time may be obtained.

For example, when moving image data is read from the SSD 3, the host 2 transmits plural read requests to the SSD 3. For example, the SSD 3 collectively manages the plural read requests as a series of access sequences in the table TB1. As a result, the SSD 3 may obtain the idle times for the plural read requests collectively.

Second Embodiment

A second embodiment is a modification of the first embodiment. In the first embodiment, it has been described that the I/O characteristics determining unit 431 of the application layer 43 may determine whether to perform performance adjustment for a process. Meanwhile, in the second embodiment, the operating system 42 may group processes, and determine the performance characteristics for each process group.

Figure 8:
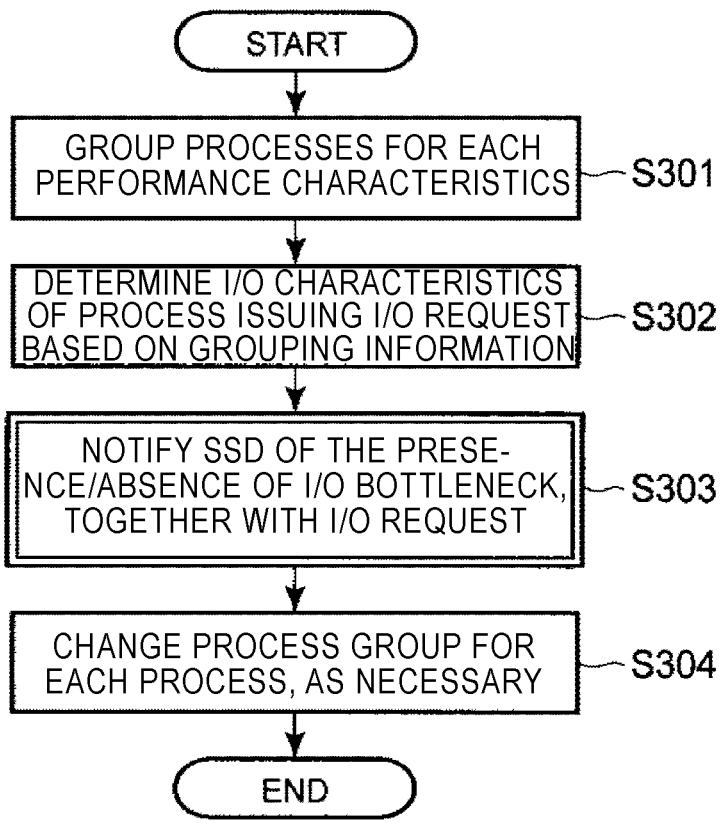
FIG. 8 is a flowchart illustrating an example of a process managing process in a host according to a second embodiment.
Figure 9:
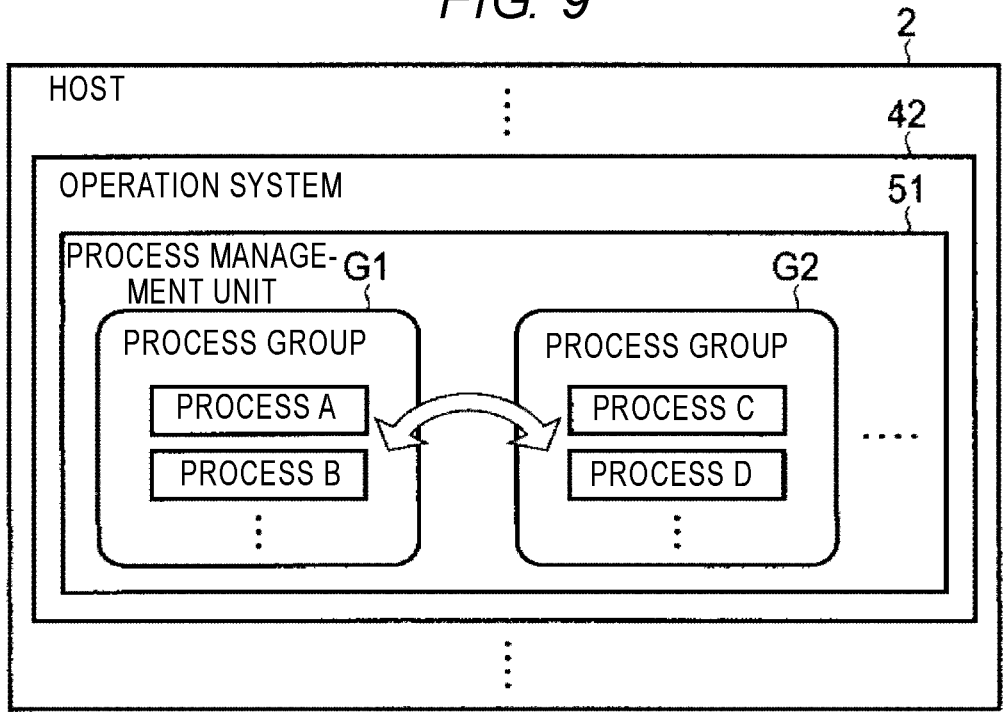
FIG. 9 is a view illustrating an example of a process group according to the second embodiment.

FIG. 8 is a flowchart illustrating an example of a process managing process in the host 2 according to the second embodiment. FIG. 9 is a view illustrating an example of a process group according to the second embodiment. In the second embodiment, since the computer system 1 has the same configuration as that of the first embodiment except for the process management unit 51, explanation thereof will be omitted.

In step S301, the process management unit 51 of the host 2 groups processes for each performance characteristics.

More specifically, for example, as illustrated in FIG. 9, the process management unit 51 may manage or generate plural process groups. For example, the process management unit 51 may manage processes in which an I/O is a bottleneck (e.g., processes A and B) as a process group G1, and manage processes in which other hardware resources are a bottleneck (e.g., processes C and D) as a process group G2.

By generating such process groups, for example, when a CPU processes a process included in a process group that is a bottleneck, the host 2 may grasp or determine that performance adjustment is performed on the SSD 3. Further, for example, when an I/O processes a process included in a process group that is a bottleneck, the host 2 may grasp or determine that no performance adjustment is performed on the SSD 3 (i.e., a process with the best effort can be requested).

In addition, the process management unit 51 may change a process group to which each process belongs, for example, in accordance with a change in performance characteristics of each process.

In step S302, the process management unit 51 determines the I/O characteristics of a process issuing an I/O request, based on the information on the performance characteristics for each process group obtained in step S301.

In step S303, the process management unit 51 notifies the SSD 3 of the presence/absence of I/O bottleneck based on the determined I/O characteristics, together with the I/O request. The SSD 3 may receive the notification and perform the performance adjustment. Since the performance adjusting process is the same as that described above with reference to FIG. 6, explanation thereof will be omitted.

In step S304, the process management unit 51 changes a process group to which each process belongs, as necessary.

As described above, in the second embodiment, the operating system 42 may manage each process by generating process groups according to the performance characteristics of each process. As a result, since a process for grasping or determining the I/O characteristics for each process is unnecessary for the host 2, the processing load on the host 2 can be reduced.

Third Embodiment

A third embodiment is a modification of the second embodiment. In the third embodiment, in addition to the second embodiment, a process requiring performance adjustment may be notified in advance from the host 2 to the SSD 3. In accordance with an instruction from the host 2, the SSD 3 may store information indicating an adjustment value of the response performance for each process. This information may be expressed in a format of table, for example. Based on the adjustment value described in the table, the SSD 3 may adjust the performance of response to a request associated with a process managed by this table. Since the performance adjusting process executed by the SSD 3 is the same as that described above with reference to FIG. 6, explanation thereof will not be repeated.

Further, since the computer system 1 according to the third embodiment has the same configuration as the first embodiment, explanation thereof will be omitted.

FIG. 10 is a view illustrating an example of a table TB2 for managing the performance adjustment for each process according to the third embodiment.

The table TB2 manages, for example, a process ID 201 and an adjustment value 202 in association with each other.

The process ID 201 may be information capable of identifying a process, for example, an ID number allocated for each process. The process ID may be, for example, a process name.

The adjustment value 202 may be a numerical value indicating how much percentage of the best-effort performance is expected for a process-dependent request to be processed by lowering the response performance. In other words, the adjustment value 202 indicates the expected operation performance for each process. For example, in the example of FIG. 10, the SSD 3 indicates processing with the response performance with the best effort for a request associated with the process ID of 1, and processing with the response performance with 90% of the best effort for a request associated with the process ID of 2.

It is preferable that the contents included in the table TB2 are changeable flexibly. For example, the contents included in the table TB2 may be, for example, changed, updated, or deleted according to, for example, an instruction from the host 2 or an instruction from the performance control unit 30.

In addition, the host 2 may use a reserved area of a read command or a write command defined in the NVMe standards to notify the SSD 3 of the process ID.

As described above, in the third embodiment, a table for managing the adjustment value of the operation performance for each process performing the performance adjustment may be stored in the SSD 3. This enables fine performance adjustment for each process ID in the SSD 3.

In addition, the table TB2 may be expressed in another form capable of associating a request and the adjustment value 202 with each other. For example, the table TB2 may manage the data type ID and the adjustment value in association with each other. More specifically, for example, the table TB2 may indicate processing with the response performance with the best effort for metadata, and processing with the response performance with 90% of the best effort for moving image data.

In the third embodiment, the SSD 3 may transmit the processing time after the performance adjustment of each request to the host 2, for example in response to a request from the host 2 is performed. The processing time after the performance adjustment may be, for example, the processing time recorded in the table TB1 or the processing time assumed from the past execution history. In addition, at the timing of receiving the request from the host 2, the SSD 3 may add, for example, the amount of processing and the surplus capacity that are being processed in parallel within the SSD 3, to the assumed processing time. The host 2 may determine the above-described adjustment value 202 based on the processing time transmitted from the SSD 3.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A storage device that is accessible by an external device via an interface, the storage device comprising:
a nonvolatile memory including one or more blocks; and
a controller electrically connected to the nonvolatile memory,
wherein the controller is configured to
receive from the external device a request and a notification indicating that a response performance of the request is to be lowered, and
in response to receiving the request and the notification, calculate a response time longer than a processing time of the request based on the received notification,
select a block managing process of the nonvolatile memory that is executable within an idle time which is a difference between the calculated response time and the processing time of the request, and
execute a performance lowering process and a process corresponding to the request during a period of time starting from the receiving of the request and ending when the calculated response time passes, the performance lowering process executing the selected block managing process, the selected block managing process starting from when the processing time of the request passes and ending within the idle time,
wherein the storage device stores first information indicating an adjustment width of the response performance and second information indicating the processing time of the request received from the external device and an adjustment state of the response performance, and
the controller is further configured to determine the response time based on the first information and the second information.

2. The storage device according to claim 1, wherein the second performance lowering process is a process of reducing the number of parallel accesses to the nonvolatile memory.

3. The storage device according to claim 1, wherein the block managing process is wear leveling or garbage collection.

4. An information processing system comprising:
a host device as the external device according to claim 1; and
a storage device according to claim 1,
wherein the host device is configured to
group a plurality of processes to be executed by the host device into multiple groups having respective performance characteristics,
determines, for each group, I/O characteristics of a process issuing the request, and
transmit to the storage device a notification indicating whether or not to lower the response performance of the request, based on the determined I/O characteristics.

5. An information processing system comprising:
a host device as the external device according to claim 1, including a plurality of hardware resources; and
a storage device according to claim 1,
wherein the host device is configured to
determine I/O characteristics of a process issuing the request based on a usage rate of the plurality of hardware resources, and
transmit to the storage device a notification indicating whether or not to lower the response performance of the request, based on the determined I/O characteristics.

6. The storage device according to claim 1, wherein
the controller is further configured to store first information indicating an adjustment value of a response performance for the request received from the external device, and
the idle time corresponds to the adjustment value.

7. The storage device according to claim 1, wherein the controller is further configured to:
determine whether the block managing process is completed within the idle time, and
in response to determining that the block managing process is completed within the idle time, select the block managing process and execute the performance lowering process that executes the selected block managing process.

8. A storage device that can be accessed by an external device via an interface, comprising:
a nonvolatile memory including one or more blocks; and
a controller electrically connected to the nonvolatile memory,
wherein the controller is configured to
store first information indicating an adjustment value of a response performance for each request received from the external device,
calculate a response time for the request received from the external device based on the first information,
select a block managing process of the nonvolatile memory that is executable within an idle time which is a difference between the calculated response time and a processing time of the received request, and execute a performance lowering process and a process corresponding to the request during a period of time starting from the receiving of the request and ending when the calculated response time passes, the performance lowering process executing the selected block managing process, the selected block managing process starting from when the processing time of the request passes and ending within the idle time, wherein the idle time corresponds to the adjustment value, the storage device stores second information indicating the processing time of the request received from the external device and an adjustment state of the response performance, and the controller is further configured to determine the response time based on the first information and the second information.

9. The storage device according to claim 8, wherein the second performance lowering process is a process of reducing the number of parallel accesses to the nonvolatile memory.

10. The storage device according to claim 8, wherein the block managing process is wear leveling or garbage collection.

11. An information processing system comprising:
a host device as the external device according to claim 8; and
a storage device according to claim 8,
wherein the host device is configured to
group a plurality of processes to be executed by the host device into multiple groups having respective performance characteristics,
determines, for each group, I/O characteristics of a process issuing the request, and
transmit to the storage device a notification indicating whether or not to lower the response performance of the request, based on the determined I/O characteristics.

12. An information processing system comprising:
a host device as the external device according to claim 8, including a plurality of hardware resources; and
a storage device according to claim 8,
wherein the host device is configured to
determine I/O characteristics of a process issuing the request based on a usage rate of the plurality of hardware resources, and
transmit to the storage device a notification indicating whether or not to lower the response performance of the request, based on the determined I/O characteristics.

13. The storage device according to claim 8, wherein the controller is further configured to:
determine whether the block managing process is completed within the idle time, and
in response to determining that the block managing process is completed within the idle time, select the block managing process and execute the performance lowering process that executes the selected block managing process.

* * * * *